Inventor
Donald F. Swanson
by John F. Brezina
Attorney

Oct. 18, 1949.   D. F. SWANSON   2,485,246
COFFEE MAKING APPARATUS AND AUTOMATIC
CONTROL MEANS THEREFOR

Filed June 2, 1944   2 Sheets-Sheet 2

Inventor
Donald F. Swanson
by John F. Brezina
Attorney.

Patented Oct. 18, 1949

2,485,246

UNITED STATES PATENT OFFICE 2,485,246

COFFEE-MAKING APPARATUS AND AUTOMATIC CONTROL MEANS THEREFOR

Donald F. Swanson, Chicago, Ill.

Application June 2, 1944, Serial No. 538,480

6 Claims. (Cl. 99—283)

This invention is directed to improvements in a novel coffee-making apparatus commonly known as coffee urns of the industrial type. More particularly my invention is directed to a novel combination and arrangement of parts in a coffee-making apparatus wherein a pre-determined and desired volume of water of a sufficiently high temperature will be measured and selectively forced thru a closed path to a swivelly-mounted spray head and only under selected pre-determined conditions of temperature.

An important object of my invention is the provision of automatic means and mechanism in a coffee making apparatus for measuring the desired volume of hot water and for forcing such pre-determined volume of sufficiently hot water from the heating tank to the spray head only if the water is heated to desired temperature, from where it drops down into and thru the ground coffee into the finished coffee compartment or compartments.

A further object of my invention is the provision of a coffee making apparatus having an outer water heating tank communicatively connected thru a series of pipes with the spray head above the coffee-making receptacle or compartment, and in which pipes defining a closed path there is mounted an electrically operated flow valve which is selectively controlled from a water circulating control device so as to open and close the hot water feed line at the desired times, and in which the cooperating reservoir water temperature-responsive device is operatively connected with a control switch which opens or closes the circuit to said electrically operated valve so that said flow valve cannot be opened to permit passage of any water to said tank unless the reservoir water is at or above a desired temperature, this being adapted to prevent inexperienced employees from brewing coffee with water of too low temperature.

A further object of my invention is the provision of a coffee making apparatus including an inner coffee making compartment or receptacle contained within an outer water heating tank and including a circuitous pipe thru which the hot water may be passed by pressure of the cold water supply source from the hot water reservoir to be delivered thru the spray head, and in which pipe there is mounted a water meter operatively connected to open and close a movable control switch which is adapted to open and close an electrically actuable valve interposed in said circuitous pipe for the purpose of permitting only the desirable volume of sufficiently hot water to be delivered to the spray head at one filling or at one delivery.

The further object is to provide a practical and economically manufacturable coffee making apparatus of the aforesaid type which includes automatic hot water feed controls as aforesaid and which includes a temperature-responsive circulator control device connected in the circuit of the electrically-operated flow control valve to permit and to assure the correct making of the brew of coffee by unskilled employees with no experience in operating coffee brewers, and to make it impossible of such employees to admit insufficiently hot water or an improper quantity of water. A further object is to provide a hot water reservoir or tank which is sealed from the atmosphere and which has associated therewith means for syphoning only a part of the hot water therein from the upper portion of the closed tank, said hot water being under the pressure of the cold water supply source so as to constantly retain hot water in the major portion of the tank to in turn maintain coffee in the coffee-containing receptacle at a sufficiently hot temperature over a relatively long period of time.

Other objects include the provision of an electrically energized and manually controllable flow control valve and a meter mounted adjacent the hot water tank, and a temperature-responsive thermostat or circulator control switch means adapted to open and close the circuit to said electrically controlled valve controlling the water inlet to said meter as well as a manually operated control switch for selectively controlling the electrical energy of the said apparatus, said thermostat controlled switch and said manual control being closable at one time to cause opening of said flow control valve.

A further object is the provision of a coffee making apparatus having a reservoir which is communicatively connected by a conduit or the like directly with the cold water pressure source in the supply main, and in which the communicating conduit has a manually adjustable pressure-regulating device so as to permit reduction of the pressure before entry into said reservoir, said manually reduced and adjusted pressure being adapted to regulate and control pressure and speed of delivery of the hot water from the reservoir to the coffee-brewing compartment when the provided communicating pipe is opened, the foregoing being further adapted to prevent the building up of undesirable amount of air or steam pressure above the water surface in the reservoir the creation of which pressure in presently used urns makes difficult the determination of the correct volume of hot water passed to the coffee-brewing compartment at a given time.

Other and further objects of the invention will be apparent from the following description, appended claims and accompanying drawings.

Figure 1:
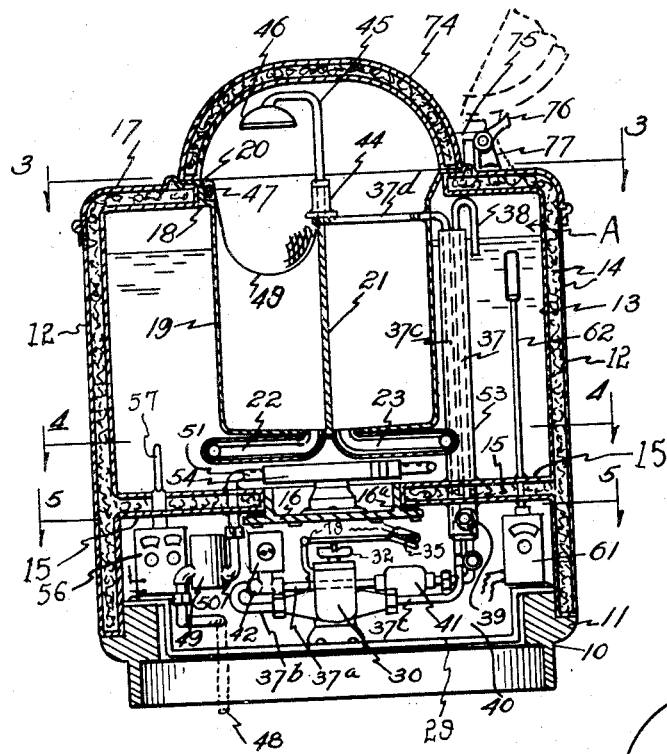
Fig. 1 is a longitudinal and sectional view taken on vertical plane of the coffee urn or apparatus, showing certain interior parts in elevation.

This invention (in a preferred form), is illustrated in the accompanying drawings and described by numerals of reference borne on the accompanying drawings.

Referring to drawings, reference numeral 10 designates a suitable metal base which is preferably of oval or rounded shape and which may be cast or otherwise suitably formed. Base 10 is preferably formed with an outwardly extending annular flange 11 which merges with the said base to form an annular shoulder. A housing or container designated generally as "A" and preferably of a cross sectional shape to correspond with said base, is composed of an outer metal wall, liner or shell 12 and an inner spaced metal wall liner or shell 13, and which are sufficiently spaced apart to provide for mounting therebetween of a suitable insulating material or liner designated generally as 14. The lower peripheries of said shells 12 and 13 are preferably joined together, as by welding or the like, and rest upon the shoulder of the annular flange 11 of base 10.

The inner shell 13 is provided with an annular insulated wall or baffle 15 which extends horizontally and inwardly to define a central opening and accessible passage in which centrally passaged plate member 16 is adapted to be removably mounted, for example by screws (not shown) to permit access to interior parts in assembly and during repair of the unit. A suitable gasket 16a is mounted between the peripheral flange of plate 16 to effectively seal said passage. The annular wall 15 is preferably insulated and preferably formed of a continuation of the inner shell 13 as illustrated in Fig. 1. The upper portions of the outer and inner shells 12 and 13 are bent or extended horizontally and inwardly to form an insulated top portion 17 and which define a relatively large opening 18 therein.

An inner receptacle or tank 19 made of metal and having an outwardly extending annular and peripheral flange 20 is suspended or mounted in the opening 18 so that said flange 20 rests upon the top portion 17 as illustrated in Fig. 1. Said flange 20 is preferably soldered or welded or equivalently sealed to said top portion so as to hermetically seal the annular compartment within the outer reservoir or container A. The flanged plate member 16 is removably secured in the central opening defined by the lower annular wall 15 to seal said opening with the aid of a suitable gasket or liner 16a. Such securance may be by removable screws (not shown).

Figure 2:
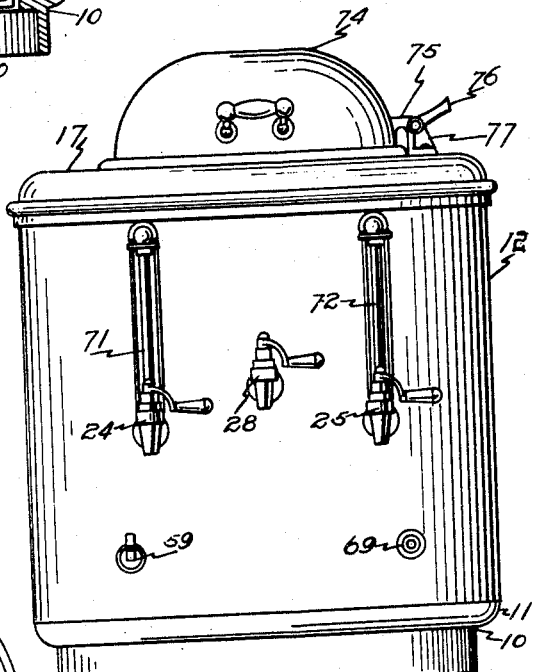
Fig. 2 is a front elevation of the said coffee making apparatus.
Figure 3:
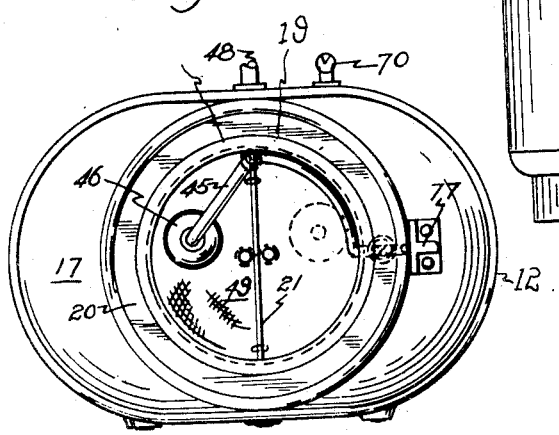
Fig. 3 is a partially top plan view and partially cross-section view taken on line 3—3 of Fig. 1.
Figure 4:
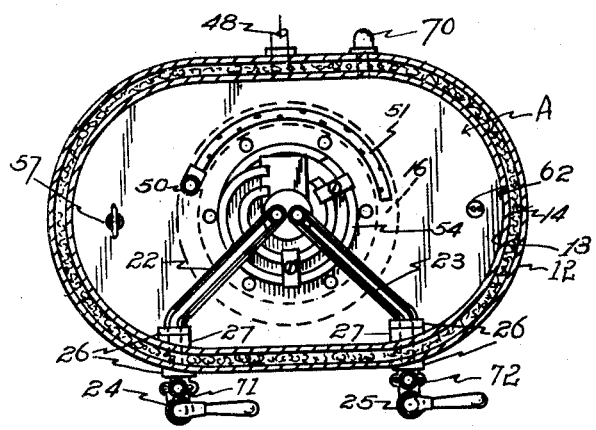
Fig. 4 is a cross-section view taken on a horizontal plane indicated by the line 4—4 of Fig. 1.
Figure 5:
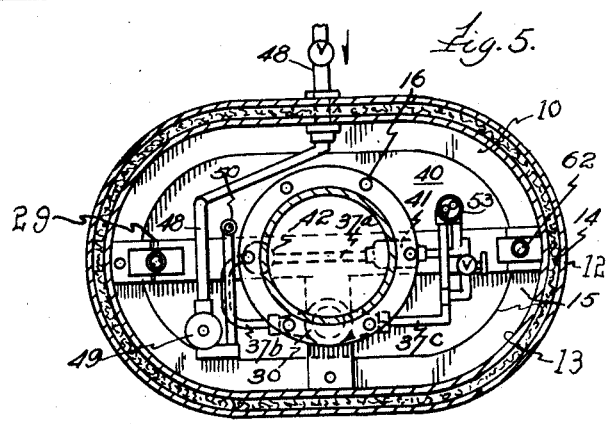
Fig. 5 is a cross-sectional view taken on a horizontal plane indicated by the line 5—5 of Fig. 1.

The inner tank 19 optionally is provided with a central vertical cross wall 21 to divide said tank into two separate compartments so as to permit using either one or the other of said compartments for the brewing or making of the coffee. As illustrated in Figs. 1, 2 and 4, the compartments of tank 19 have mounted in the lower ends thereof respectively the end portions of outlet pipes or conduits 22 and 23 which lead to and are communicatively connected to exterior accessible faucets or valved cocks 24 and 25, illustrated in Figs. 2 and 4, and which cocks are suitably mounted on the outer shell 12 at the desired locations. The points at which said outlet pipes 22 and 23 thru which the finished coffee is drawn and at which they pass thru the inner shell 13 and outer shell 12 are effectively sealed in a conventional manner as for example with the aid of opposed lock nuts 26 and gaskets 27 respectively as illustrated in Fig. 4.

An optional though desirable water outlet faucet 28 is mounted upon front face of reservoir 80 and extends thru adjacent openings in shells 12 and 13 and is sealed in said openings in the usual manner to form a water tight seal. This faucet 28 permits selective withdrawal of hot water from reservoir A, as for example when the user desires to pour additional water over and thru the coffee and into the inner tank 19.

As indicated in Fig. 1 the outlet pipes 22 and 23 are preferably so located that they are disposed within the reservoir A, so that the coffee contained therein will be maintained hot by conduction from the hot water contained within the reservoir, it being understood that the main portion of the coffee which frequently stands in said outlet pipes is first drawn out for use thru said valved cocks 24 and 25.

As shown in cross section Fig. 1, a suitable bracket or supporting cross bar 29 has its opposite ends secured to the inner portions of base 10 in any suitable manner. Secured on an intermediate portion of bracket 29 is a water meter 30 of conventional construction and which includes interior mechanism having a plurality of gears (not shown) and which has operatively connected to its movable gear mechanism an upwardly extending journalled shaft 31 on whose upper end is mounted a recessed cam 32. The recessed cam 32 has an upwardly extending peripheral edge flange 33 which has a recess 34 therein opening upwardly. The downwardly extending portion, hereinafter described, of a pivoted lever of an electrical control switch 35 connected in the circuit of the solenoid-operated flow control valve is adapted to ride on the upper edge surface of edge flange 33 and to intermittently seat in recess 34 for a purpose hereinafter described. When the interior mechanism of said meter 30 is operated by the passage of water thru the closed path of said meter such movement will be transmitted to rotate cam 32 in a normal clockwise direction looking at the diagrammatic view of Fig. 6.

The means for forcing the hot water from within reservoir A to the spray head hereinafter described and subsequently into the coffee containing tank 19 includes the utilization of pressure of the main water supply source.

A feed supply pipe 48, only a fragment is illustrated in Fig. 1, is adapted to be connected from the water main supply source to a manually adjustable water pressure valve or regulator 49 shown at the lower left of Fig. 1. The outlet side of the water pressure regulator has communicatedly connected thereto a pipe 50 which extends into the interior of reservoir A and is connected to suitable header 51 having a plurality of spaced apart outlet openings therein.

I desire it to be understood that by means of the manual adjustment of the water pressure regulator 49 the pressure head of the cold water supply may thereby be reduced and adjusted to the desired degree so as to admit and pass cold water into the lower part of the reservoir A under the desired pressure and under a desirable and relatively low pressure only slightly greater than the light pressure which will normally be maintained and which will normally be created above the water level in reservoir A when the water level has risen a short distance above the downwardly directed opening of the pipe section 38.

It will be understood that when the desired quantity of water has been delivered in the hereindescribed manner to and through the spray head (usually approximately 2¾ gallons), that the quantity of water in the reservoir is reduced thereby so as to reduce the level of said water in reservoir A, though at the instant that the hot water feed path is opened to the spray head and hot water begins to flow therethrough, cold water, under lower pressure reduced manually through operation of the regulator 49, will immediately flow into the lower portion of reservoir A. As such passage of hot water continues for the desired interval and quantity through the spray head, a part of the hot water at the top of the body of water in reservoir A is drawn off due to the location of the opening of pipe section 38 and simultaneously cold water under said reduced pressure is fed to the bottom of said reservoir. It will be observed that there is air space between the level of the water in the reservoir and the top of the container A, which becomes an air cushion. As the level rises pressure of the air cushion increases, also the pressure will be increased as the temperature of the water rises. The pressure regulator 49 of the water inlet is so adjusted that the pressure of the water in the feed line balances the pressure of the air cushion when the water level is at a desired height. With these pressures balanced no more water is admitted until the pressure becomes unbalanced due to opening of the delivery conduit to the spray head, reducing the air cushion pressure below the water supply pressure, thereby admitting the water. This unbalanced relation continues as long as hot water is flowing through the spray head. When flow of hot water is stopped, water supply to the reservoir continues until the pressure balance is restored thus stopping the supply of water.

A novel feature and accomplishment of my invention is utilization in the aforesaid manner of the existing pressure of the cold water supply source to thereby force sufficiently hot water from the top part of the reservoir A to and through the spray head and thereby eliminating the undesirable and costly presently practiced method of having to build up a steam pressure above the water body in a reservoir for the purpose of forcing hot water to the coffee brewing compartment.

On presently practiced undesirable methods and presently used coffee urns, the necessity for building up a steam pressure above the hot water in the reservoir creates very objectionable and expensive factors and conditions, one being the fuel cost of bringing the reservoir water to temperature substantially above 215° F. (or upwards) and a longer time necessary to bring said reservoir water to said higher (above boiling) temperature, and secondly the fact that the steam pressures created in presently used coffee urns varies so greatly from time to time that it is practically impossible for an operator to control, by means of manually operated valves, the volume of water which the said steam pressure pushes into and through the spray head. Obviously, at certain times the water is boiled so long as to create excessive pressures above the hot water which when the valves are opened will force scalding hot water through the spray head at a much greater speed with the undesirable results of delivering not only too much water but also scalding the coffee grounds. The repeated results are improperly brewed coffee and non-uniform coffee beverage. These objectionable results in the use of presently known coffee urns are constant occurrences in restaurants and other places where urns are used and result in non-uniformity of the coffee from one batch to the next in making coffee too weak or too strong or containing undesirable ingredients of the coffee grounds which have been removed and extracted from the coffee grounds by boiling and excessively hot water.

It is well-known that the most desirable coffee beverage is brewed utilizing a temperature of approximately 210° F., which temperature avoids the extraction from the coffee grounds of undesirable ingredients and resulting undesirable taste. My apparatus and method herein described is based and most satisfactorily operated by heating the water to approximately 210° F., and when such temperature has been attained, the thermostatically-controlled switch of the fuel supply source will be closed to automatically stop the fuel supply and stop any further increase in heating of the water in the reservoir. Also when the temperature of the water in the upper portion of the reservoir is reduced below the predetermined temperature, usually 210° F., a thermostatically operated means hereindescribed, will reconnect the burner of whatever type with the fuel source to cause a resumption of heat to said water.

I will now describe the preferred illustrated means for selectively conveying the hot water from the upper part of reservoir A by pipeage or conduit means to and thru the spray head from which it falls on the ground coffee. A pipe 37 whose upper end portion is bent to form a downwardly directed goose-neck 38 whose inlet end is disposed a short distance below the upper wall or top 17 and at such a height that ample space will remain above the normal water levels to permit creation of slight air pressure rising from the surface of the body of heated water in reservoir A.

A pipe 53 is mounted in vertical position in an opening in intermediate horizontal wall 15, as shown at the right of Fig. 1, and is sealed at the point where it passes thru said opening. Pipe 53 extends upwardly to a point substantially above the normally attained water level in the reservoir and its upper end is sealed except that it has extending there through pipe 37 and return pipe 37c. The upper end of pipe 53, which provides a protective housing and conduit for said pipes 37 and 37c, is closed and sealed at the points surrounding the upper portions of said pipes to prevent escape of air from the upper part of the reservoir.

Said pipe 37 extends downwardly thru pipe 53 and has mounted therein a pressure operable pressure release valve 39 whose stem and handle portion extend outwardly thru a suitable opening in the front and lower part of the wall formed by the shells 13 and 14.

Said pipe 37 after extending thru a said pipe 53 and the intermediate wall 15 extends into the lower compartment 40 and is then bent preferably horizontally and has preferably interposed therein a suitable water filter 41. Another section designated 37a of said pipe 37 is mounted in and extends into the inlet of an electrically controlled valve 42 preferably of the solenoid type. Said flow circuit or closed path continues thru said electrically controlled valve 42 and into a conduit or pipe section 37b which is connected to and leads into the inlet end of the water or flow meter 30. Continuing, flow conduit or pipe section 37c is connected to and leads from the outlet end of water meter 30 and extends upwardly thru pipe 53 and substantially adjacent pipe 37, to a point a short distance below the upper rim of flange 20 of inner tank 19 where its horizontally bent portion or section designated 37d extends to the upper edge of the partition wall 21.

A suitable swivel member or fitting 44 is mounted on the inner end of the pipe section 37d and a goose-neck 45 has its lower end portion swivelly mounted in the swivel member 44 and communicating with pipe section 37d. The downwardly turned end portion of the gooseneck has suitably secured thereon in a conventional manner a spray head or sieve 46.

Said valve 42 is self closable by gravity when the solenoid coil is de-energized as herein described.

It will be understood that said spray head 46 and the goose neck 45 may be turned or swung so as to deliver the hot water into either of the said adjacent compartments of tank 19.

A suitable porous coffee bag 49, preferably made of fabric, and having a connected ring frame 47 is adapted to be removably suspended in either of the compartments of the inner tank 19 in a well-known manner, the desired quantity of ground coffee being poured into said bag at the desired times.

Figure 6:
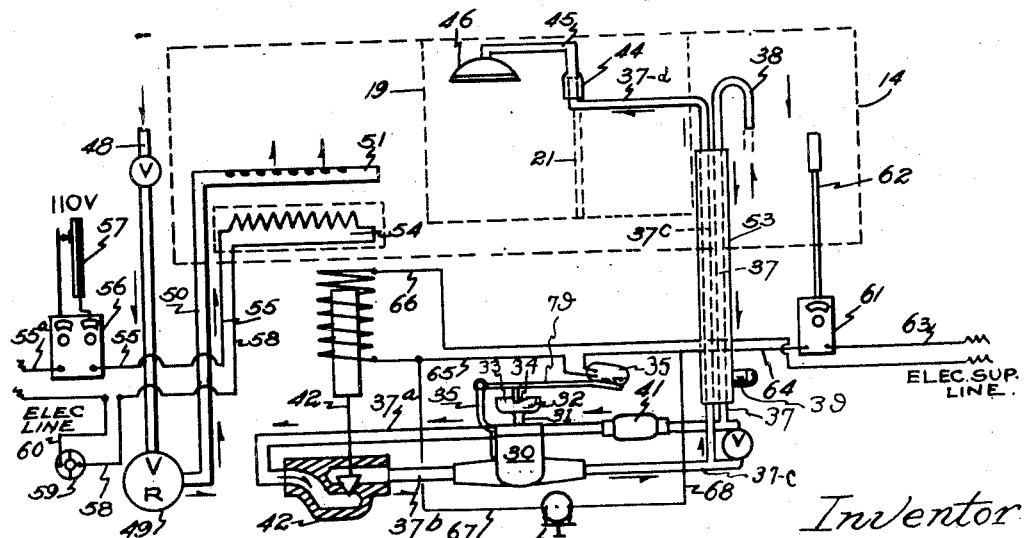
Fig. 6 is a diagrammatic view illustrating the wiring circuits and certain of the mechanical features, though in such diagrams various of the parts are for clarity located differently than in the actual apparatus.

As illustrated in Fig. 1 and diagrammatically Fig. 6, a suitable burner 54 is provided and mounted in the desired location. The particular illustration shown in Fig. 1 is an electrically energized immersion type burner which I found to be highly satisfactory. In instances where the burner is of the immersion type, the same is connected with circuit wire 55 to a terminal of temperature-responsive thermostat and control switch 56 whose heat-responsive element 57 is extended upwardly thru a suitably sealed opening in intermediate wall 15 and into the body of water in reservoir A, substantially as illustrated at the left of Fig. 1.

The opposite terminal of the thermostatic control switch is connected by a circuit wire 55a to an electric energy source.

The opposite terminal of the heater 54 is connected by circuit wire 58 to one terminal of a manually controlled switch 59 which is suitably located in an accessible position on the forward wall of shell or housing, as illustrated in Fig. 75

2. Said manual control switch 59 is connected by circuit wire 60 to the electrical supply source.

Referring to Figs. 1 and 6, reference numeral 61 designates an electrical control switch of conventional type adapted to be responsive to a temperature-responsive thermometer designated by reference 62 and which extends from said switch, herein also designated as circular control switch 61, thru a sealed opening in intermediate wall 15 to the upper portion of the compartment defined by said reservoir and so that the temperature-responsive portion of said thermostat 62 will be normally disposed in the upper portion of the body of water in said reservoir A, substantially as illustrated in Fig. 1.

One terminal of the circulator control thermostat 61 is connected by circuit wire 63 to an electric power source. The other terminal of said thermostat is connected by circuit wire 64 to the cam operated control switch and the other terminal of said cam operated control or holding switch 35 is connected by circuit wire 65 to the solenoid coil of the solenoid operated valve 42. The opposite end of the solenoid coil is connected by circuit wire 66 to an electric supply source.

It will be understood that the contact switch of thermostat 61 must necessarily be closed in order that the solenoid of control valve 42 will be raised and opened, and said contact switch of thermostat 61 will close only when the temperature of the water in reservoir A in the area surrounding the upper head portion of thermometer 62 is sufficiently high for satisfactory brewing of coffee.

Interposed in the circuit represented by circuit wires 64 and 65 and the cam-operated switch 35 is a by-pass circuit illustrated in Fig. 6 and including the circuit wire 67 and 68 and which have connected therein a manual control or starting switch 69 which is mounted outside of and upon the lower portion of the wall formed by walls 12 and 13, for example as illustrated in the lower right hand portion of Fig. 2.

The said by-pass circuit 67, 68 with control switch 69 permits the operator to close said switch at any time, and if at the instant of closing said switch 69 the water in the upper portion of reservoir A is a sufficiently high temperature for brewing to close the thermostatic switch 61 the circuit to the solenoid of flow control valve 42 is thereby closed to thereupon open said flow control valve 42 and cause the hot water from the upper portion of the reservoir to flow thru the meter 30 and flow circuit herein described and into and thru the spray head to drop upon and thru the ground coffee. When such flow of sufficiently hot water starts, the cam 32 is rotated as before described thru the operative connections with said meter to raise the holding switch 35 to closed position and hold it closed while said cam makes one revolution. When the cam has revolved one revolution, the pivoted lever 79 on which the mercury switch 35 is mounted will drop to break the said circuit through switch 35 to said solenoid valve to cause the solenoid valve to close by gravity and stop said flow. It is to be understood that the manual control switch 69 is preferably of the push-button type or of an equivalent type having a spring therein so that when the same is manually released or the pressure thereon removed that the same will immediately open said by-pass circuit. It will be understood that the manual pressure or switch-closing movement applied to the switch 69 needs to be only for an interval of a few seconds inasmuch as the flow of the first portion of the hot water thru the water meter 30 will cause cam 32 to rotate a small fraction of a revolution sufficient to elevate the lever of said cam controlled switch to close said control switch and close the circuit thru circuit wires 64 to 65, as stated. Once the cam operated switch has been closed, it will remain closed for the interval of time until depending portion of the lever 79 of said cam controlled switch 80 drops into the recess 81 of cam 32, during which interval the desired volume of hot water has been passed thru the spray head. The size and ratio of the gears within meter 30 (not shown) are such that the cam will rotate one revolution to the delivery of the desired quantity of water (usually 2¾ gallons).

As illustrated in the upper portion of Fig. 4, I provide a suitable outlet drain including a conventional fitting and valve 70 whose inner portion is mounted and sealed in a suitable passage thru the wall of the reservoir A so as to permit complete draining of the reservoir at desired time, for example for cleaning and repairing.

The housings of valve cocks 24 and 25 have communicatively connected thereto in a conventional manner the lower end portions of tubular water level sight gauges 71 and 72, as illustrated in front elevation in Fig. 2 and their upper ends are also communicatively connected thereto.

The upper opening of the coffee-brewing tank or tanks 19 is adapted to be closed selectively by a suitable concavo-convex dome-shaped cover 74 which is preferably of double walled construction as illustrated in cross section in Fig. 1, and providing sufficient space for the desired positioning of the spray head 46. Suitably secured on the periphery of the dome-shaped cover 74 is a hinge bracket 75 having a central passage therethru and which has formed integral therewith a brace 76 which is adapted to engage the intermediate portion of a hinge bracket 77 to maintain said cover at the desired angle and position when the same is in opened position. The hinge bracket 77 has its lower base portion suitably secured, as by welding, upon the upper surface of the horizontal portion of wall 12 substantially as illustrated in Fig. 1.

It will be understood that with the use of the aforesaid construction and method of operation, there is no reliance or dependency upon the slight pressure created above the water level in the reservoir A for the purpose of forcing the water over through the spray head, and this eliminates the necessity of bringing the water to a boil and building up a pressure above the water surface to force it over. This further eliminates the use of water too hot or boiling which is objectional in the proper brewing of the coffee beverage.

As stated the pressure head of the cold water source reduced by the pressure regulator 49 is utilized in the novel manner recited and without any undesirable feeding of cold water into the upper hot body of water in reservoir A. Another advantage of this method and construction is that it permits the maintenance of the water level in the reservoir substantially constant.

While in the illustration of the drawing I have shown one heating coil in the heater, I desire it to be understood that I have found the use of two separate heating coils highly satisfactory, each coil having a separate thermostat such as 56, 57 connected thereto.

A further advantage and accomplishment of said construction and method is that when the water is lower than is suitable for satisfactory brewing and as set by the thermostat 61, 62, inexperienced or careless operators, by manually pressing the button switch 69, cannot cause a flow of the water from the reservoir A to the spray head or an opening of flow valve 42, which if it were done would be the very unsatisfactory delivering of too cold water to the brewing compartment. This fact, which so often is effected by employees with present urns, and which ruins batches of coffee and results in wide non-uniformity, is impossible with my construction, arrangement and method which I have described.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In a coffee making apparatus, means providing a water reservoir, means providing a coffee making chamber, means for heating the water, means for withdrawing a measured quantity of water from the upper part of the reservoir and discharging it into said chamber; said last mentioned means including pipeage, a normally closed solenoid operated valve in said pipeage, an electrical circuit for energizing said solenoid to open the valve, said circuit including a temperature responsive control switch which holds the circuit open until the temperature of the water in the reservoir reaches a predetermined degree, a holding switch; a flow meter in said pipeage having a rotatable part carrying a cam acting against said holding switch to close it on initiation of water flow through said meter and to maintain it closed until a predetermined amount of water has passed through, whereupon the cam causes said switch to open to break the circuit to the solenoid of said valve to close said pipeage; and said circuit including a by pass around said holding switch having a push button starting switch in it, construction being such that the circuit to the solenoid can not be completed unless the water temperature is sufficiently high to close the circuit through the temperature responsive switch.

2. In a coffee making apparatus, means providing a water reservoir, means providing a coffee making chamber, means for heating the water, means for withdrawing a measured quantity of water from the upper part of the reservoir and discharging it into said chamber, said last means including conduit means, a flow control valve in said conduit means, electrically operable means for operating said valve, an electric circuit for said last mentioned means, a flow meter in said conduit means having an exteriorly rotatable part, a normally open holding switch in said circuit operable by said rotatable part to close said switch on initiation of water flow through said meter and to maintain it in closed position for the duration of flow through said meter, said rotatable part being adapted to open said switch after a predetermined volume of water has passed through the meter, and a starting circuit by passing said holding switch and having a closable starting switch in it to initially energize the said electrical means for opening said valve to waterflow.

3. A device as recited in claim 2 characterized by the fact that a temperature responsive control switch is in said circuit to maintain said circuit open until the said temperature reaches a predetermined degree.

4. In a coffee making apparatus, means providing a water reservoir, means providing a coffee making chamber, means for heating the water, pipeage for withdrawing a measured quantity of water from the upper part of the reservoir and discharging it through a spray head into said chamber, a solenoid operable valve in said pipeage, a flow meter in said pipeage, a circuit for the solenoid having a normally open holding switch and a temperature responsive control switch in it, said temperature responsive control switch keeping said circuit open until the temperature of the water in the reservoir reaches a desired degree, said flow meter having a movable part effective to close said holding switch on initiation of water flow through said meter and to hold it closed until a predetermined volume of water has passed through said meter, and a manually operable starting switch in the solenoid circuit for energizing the solenoid to open the valve to admit water to the flow meter for closing the holding switch and measuring the volume of water to be delivered to the spray head.

5. In a coffee making apparatus, means providing a water reservoir, means providing a coffee making chamber, means for heating the water, means for withdrawing a measured quantity of water from the upper part of the reservoir and discharging it into said chamber; said last means including pipeage, a normally closed solenoid operated valve in said pipeage, an electrical circuit for energizing said solenoid to open the valve, said circuit including a temperature responsive control switch which holds the circuit open until the temperature of the water in the reservoir reaches a predetermined amount, an electrical holding switch in the circuit of said solenoid; said holding switch comprising a mercury switch mounted on an arm to swing in open and closed relation; a flow meter in said pipeage having a rotatable part carrying a cam acting against said arm to swing it to close the circuit through the mercury switch on initiation of water flow through said meter and to maintain it closed until a predetermined amount of water has passed through it, whereupon the cam causes said arm to swing in the opposite direction to open the switch and breaking the circuit to the solenoid of said valve to close said pipeage, a depressible spring mounted starting switch connected in circuit with said solenoid circuit and adapted, when manually closed, to close said solenoid circuit to initiate the flow through said pipeage and to effect closing of said holding switch.

6. In a coffee making apparatus, means providing a water reservoir, means providing a coffee making chamber, means for heating the water, means for withdrawing a measured quantity of water from the upper part of the reservoir and discharging it through a spray head into said chamber, said means including a conduit having a valve in it normally closing the conduit for water flow, a solenoid for operating said valve; an electrical circuit for the solenoid including a normally open holding switch, a thermal element partially extending into said water reservoir; a thermostatic control switch operatively connected to said thermal element and adapted to open and close the circuit in accordance with minimum temperatures of the water; a normally open starting switch, said water temperature-responsive thermostatic controlled switch being adapted to be closed only when the temperature of the water is above a predetermined degree, the closing of the starting switch energizing the solenoid to open the valve for water flow, and a flow meter in said conduit having an exteriorly rotatable cam acting against the holding switch to close it and keep it closed while water flows through said meter, said cam allowing said holding switch to open after a predetermined amount of rotation to thereby de-energize said solenoid to allow closing of the valve.

DONALD F. SWANSON.

REFERENCES CITED

The following references are of record in the file of this patent:

UNITED STATES PATENTS

| Number | Name | Date |
|---|---|---|
| 1,508,809 | White | Sept. 16, 1924 |
| 1,665,728 | Canright | Apr. 10, 1928 |
| 1,837,368 | Medin | Dec. 22, 1931 |
| 1,887,849 | Peirce | Nov. 15, 1932 |
| 2,107,955 | Nutter et al. | Feb. 8, 1938 |
| 2,263,252 | Tallman | Nov. 18, 1941 |
| 2,346,389 | Peters et al. | Apr. 11, 1944 |

FOREIGN PATENTS

| Number | Country | Date |
|---|---|---|
| 747 | Great Britain | July 29, 1915 |
| 106,778 | Australia | Feb. 27, 1939 |